May 8, 1934.  E. G. BUDD  1,958,158
FABRICATING AND WELDING WIDE SHEETS OF METAL
Filed July 2, 1929   2 Sheets-Sheet 1

INVENTOR.
EDWARD G. BUDD.
BY
ATTORNEY.

May 8, 1934.　　　　　E. G. BUDD　　　　　1,958,158

FABRICATING AND WELDING WIDE SHEETS OF METAL

Filed July 2, 1929　　　2 Sheets-Sheet 2

INVENTOR.
EDWARD G. BUDD.
BY
ATTORNEY

Patented May 8, 1934

1,958,158

UNITED STATES PATENT OFFICE 1,958,158

FABRICATING AND WELDING WIDE SHEETS OF METAL

Edward G. Budd, Philadelphia, Pa., assignor to Edward G. Budd Manufacturing Company, Philadelphia, Pa., a corporation of Pennsylvania Application July 2, 1929, Serial No. 375,362

5 Claims. (Cl. 219—10)

The sheet metal stock and method of fabricating the same of my invention is intended for die drawing, and particularly for the die drawings of those relatively deep and expansive stampings of light gauge metal utilized in automobile body construction. The side structure of an automobile body is now die drawn in entirety from a single integral sheet. Deep and expansive stampings of light gauge sheet metal, it is conceived, will also find extensive use in vehicles and vessels of other descriptions. Light gauge sheet metal is used extensively in the manufacture of railway car bodies and of airplanes. My invention will find adaptability here, and be a benefit to many other industries.

The deeper or more expansive or both of these a stamping can be made, the greater portion of any structure made by die stamping it is possible to comprehend in a single stamping, assuming, of course, that the structure of the portion comprehended is such that it can be made as a single die stamping, by one operation or a multiple number of operations. Such monopiece fabrication of greater portions of structures cuts down die expense by eliminating the multiple dies of multiple parts, and cuts the cost of production, eliminating cutting and handling expense of multiple numbers of small sheets, doing away with excessive loss due to trimming, reducing the number of press operations, freeing many presses for other work, and lessening the handling expenses, and cuts cost of assembly by an immensely lessened number of joints between parts which need be made. Moreover, viewed from the standpoint of the ultimate product, by virtue of the eliminated joints, there is attained a greater strength, a high degree of beauty and refinement and a freedom from surface irregularities, all of which make for a magnified improvement in quality.

Where extended portions of the structure to be fabricated were devised or invented of such form as to be susceptible of monopiece die drawing, the obtaining from the steel mills of sheets initially hot rolled of sufficient area to produce the structure has enabled the foregoing advantages to be realized in part. But this realization has been only in part and relatively inadequate inasmuch as the extremely high cost of light gauge sheets of extremely large area has in many cases more than offset the great aggregate savings possible through this method. Instead of rising in arithmetical ratio with increase in width, the cost of hot rolled light gauge sheet metal stock and indeed, the cost of heavier gauge hot rolled sheet stock, rises in geometrical ratio. The result has been that many attempted practices of this method of extensive monopiece construction have proven failures and resulted in extensive losses to the manufacturers.

Furthermore, it is found that as the size of the sheets increases, it becomes more and more difficult to maintain uniformity of gauge, and in the larger sheets the central portion is inevitably thicker than the edge portions, due to bending of the rolls. This necessitates purchasing sheets having the central portion of heavier gauge than required in order to secure edge portions of sufficient thickness.

In addition, it is found that it is extremely difficult to uniformly anneal large sheets of the kind in question, the tendency being that the edges will be over annealed or burnt while the center will be under annealed, and varying in annealing from one point to another.

It is one aim of my invention to reduce the existing price differential of relatively narrow and relatively wide mill rolled stock and to place the foregoing important advantages within easy and controllable reach, thereby making it possible for manufacturers of sheet metal structures at large to build structures of deep and expansive stampings according to the monopiece method consistently at a profit. Stated from another angle, this object of my invention is to secure more cheaply the hot rolled light gauge sheet stock for die drawing at a markedly reduced cost as compared with its production by former methods.

Another object of the invention is to produce relatively wide flat stock sheets having a gauge which does not vary between the edge portions and center, but which shall be substantially uniform from edge to edge.

A still further aim is to produce flat stock sheets of the relatively great width in question, which shall be uniformly annealed and shall possess the same drawing qualities throughout.

I attain these objects by constructing a relatively wide flat stock metal sheet of a multiple number of relatively narrower or smaller flat stock sheets welded together in a common plane to constitute the sheet of required width. I flash weld these narrower sheets together, and reduce the seam of the weld to a gauge not greater than that of the sheets. The narrow sheets are hot rolled stock and, of course, each is of substantially uniform gauge throughout. I rectify and clean the longitudinally extending edges of these sheets, flash weld them together, machine the flash of the weld almost to the gauge of the sheets and then hammer it precisely to the gauge of the sheets. Thereafter, I wash the sheets to remove the adhering products of the weld and the flash removal and the wide and expansive sheet is ready for use. The cost of the relatively narrow hot rolled stock of light gauge is far less than that of the relatively wide stock especially of extreme widths, such as 60—72—84 inch width stock. The cost of edge rectifying and cleaning, welding, flash removal, hammering and washing is very small. The net cost of the relatively wide sheet metal stock of my invention is so much less that relatively deep and expansive monopiece die stamping may be generally used.

In the achievement of my invention there is realized a second advantage constituting a corollary improvement to the outstanding advantages. This is the great increase in the flexibility of the sheet metal stores at fabricating plants. It becomes possible to adapt existing stocks on short notice to meet urgent requirements. Expansive sheets may be made of a multiple number of small ones in varying combinations. Indeed, they may be compounded of smaller sheets of different gauge. On occasions where different portions of the same monopiece structure require different strengths, appropriate gauges may be used with great economy in metal. The run of the grain of the rolled sheets may be adjusted to suit different conditions of draw. It is a well known fact that rush orders at steel mills present considerable difficulty owing to the normally extremely busy condition of the mills, and the relatively complicated processes under which steel is manufactured. Schedules and prices must be determined and orders placed long in advance to assure timely deliveries and uniform flow of material from steel mill to the sheet metal fabrication plant. Moreover, in cases of strikes and walkouts sheet metal fabrication plants are shut down often as long as the steel mills themselves. The flexibility of application of existing stores attained by my invention protects the manufacturer of sheet metal products of great size and not only enables the manufacturer of sheet metal structures of large size to meet emergencies, but protects him to a large extent against shortages.

In the accompanying drawings I have illustrated the process of the product of my invention diagrammatically.

Figure 1 is a perspective view representing the hot rolling of two relatively narrow light gauge sheets 10 and 11, the grain of the roll of which runs in the direction of the arrows 12. These sheets when the rolling is finished are cut into suitable lengths and perhaps into even narrower widths. Their longitudinally extending edges 13 are not even and often oxidized.

Figure 2 is a view in transverse cross section showing these two relatively narrow flat stock sheets in transverse cross section with their longitudinally extending edges 13 being trimmed by shears 14 in order to rectify and clean these edges. Only so much is trimmed off as is necessary to make these edges truly rectilinear. Often they are out a considerable fraction of an inch.

Figure 3 represents diagrammatically in plan the two sheets 10 and 11 having their trimmed and rectified edges 13 juxtaposed in a flash welding machine. In this machine the welding guides are designated 15, the welding transformer 16, the edges 13 are spaced slightly apart by gauges 17—18 temporarily placed between them to fix such an angle of divergence between the sheets as to properly start the arc at one end, in this case the left end, as the sheets are approached, and to progress it uniformly toward the opposite end, with the burning away of the minimum metal and uniform flashing and heating.

Figure 4 is a transverse cross section representing the two sheets 10 and 11 flash welded together in the seam 19 projecting from which there is considerable flash. This figure also shows that flash in process of being removed by cutters 20 diagrammatically shown.

Figure 5 is also a transverse section of sheets 10 and 11 showing flash substantially entirely removed from the seam 19 and the seam reduced almost to the gauge of the sheets 10 and 11. This view also shows the sheet between the opposed hammers 21 by means of which seam 19 now almost engaged is to be reduced precisely to gauge.

Figure 6 is also a transverse cross section showing the two relatively narrow sheets 10 and 11 as completely formed into the single relatively wide and expansive flat hot rolled sheet 22. It shows the seam 19 reduced precisely to gauge as it has left the hammers 21 as at Fig. 5.

Figure 7 is a perspective view showing the completed relatively wide sheet 22 as it leaves the oil spray 23 which washes from it the occasional adhering products 24 of the flash weld of Fig. 3 and the flash removal of Fig. 4.

The process by which the relatively narrow sheets 10 and 11 are formed is immaterial, the hot rolled process is preferred. No difficulty is found in making these narrow sheets of substantially uniform gauge throughout. After formation there may or may not be treating by annealing and pickling of the sheets in accordance with the quality and finish required. The shears 14 may be of any known type, reciprocating rectangular knife equipped shears are preferred. The sheets may be rolled and sheared one at a time from single sets of rolls or shears. The flash welding machine may be of any known type. Flashing may be carried out according to any known process. Any desired means of inserting in the moving gauges 17 and 18 and any needful dimensions of these gauges may be used.

Figure 7:
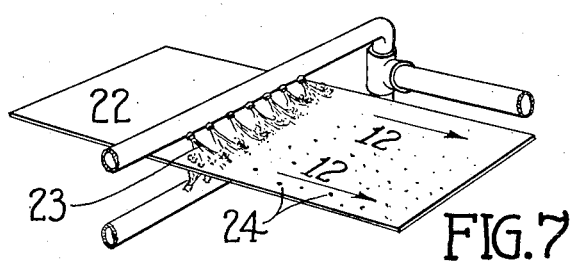
Figure 9:
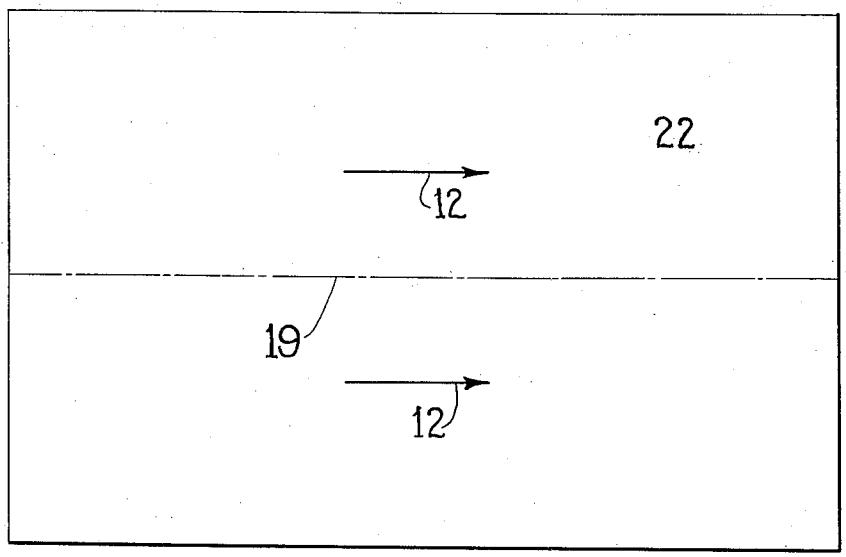
Figure 9 is a plan view of a completed sheet 22 the seam 19 being indicated by a broken line of a size sufficient to form an entire side of an automobile body.
Figure 10:
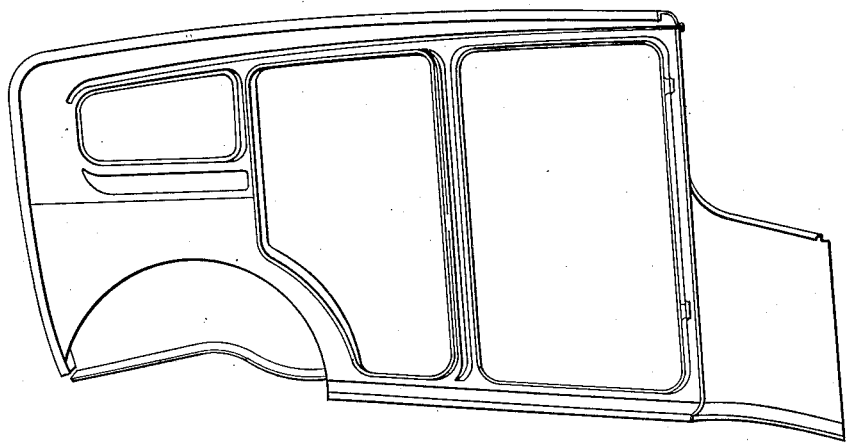
Figure 10 is a perspective of a monopiece stamping of this large portion of an automobile body from the sheet 22.

In the final product of my invention the compound sheet 22 as it leaves the cleaning apparatus of Fig. 7, the rolled grain 12 of the sheet is parallel and parallel to the seam 19 inasmuch as the longitudinally extending edges 13 of the narrow sheets 10 and 11 have been welded together and these edges are parallel to the original grain 12 of sheets 10 and 11.

Figure 1:
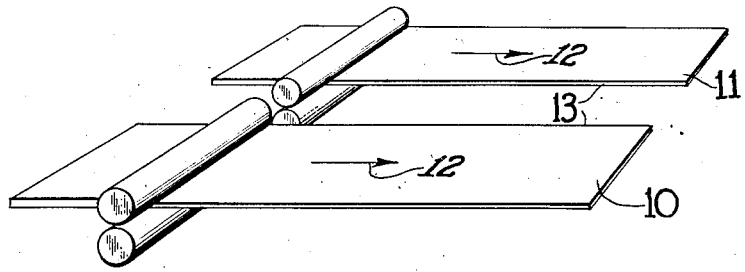
Figure 2:
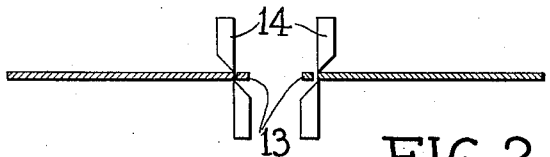
Figure 3:
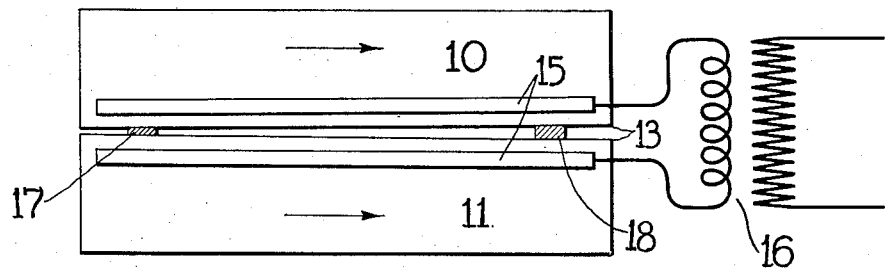
Figure 4:
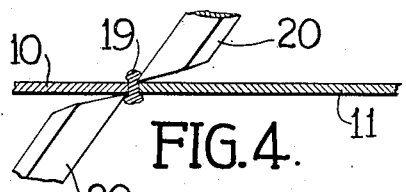
Figure 5:
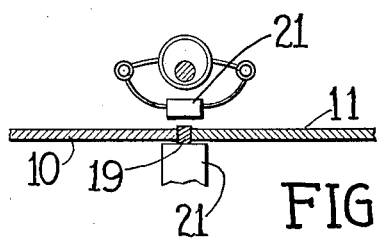
Figure 6:
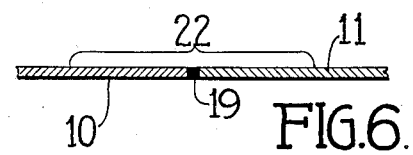

The cutters 20 may be milling cutters, planing tools of one type or another or even grinding wheels, or other construction. Any known means of clamping or holding the sheets or of moving the sheets may be utilized in either the welding machine represented in Fig. 3 or the flash trimming machine represented by Figure 4. This is true also of the hammering apparatus illustrated in Figure 5. Equivalent devices may be substituted for the hammers which carry out this step of reduction of the seams almost to gauge, precisely to gauge. So too, the sprays illustrated in Figure 7 may be oil sprays or sprays of other mediums or indeed, other devices may be utilized to move the adherent products 24 of the weld of Figure 3 and the flash removal of Figure 4. The final products heretofore were composed of two sheets 10 and 11 as illustrated or another multiple number. In the complete fulfillment of that corollary rendering flexible much of existing sheet metal stores especially, the final product may be a product of a variety of shapes and necessitate a variety of seams 19 at various directions to each other.

Figure 8:
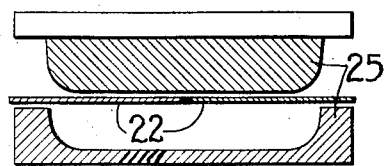
Figure 8 is a transverse cross section of a completed relatively wide stock sheet in place between the dies.

In carrying the method through to the completion of a sheet metal article of irregular surface contour such as an automobile body or portion thereof, the completed relatively wide stock sheet 22 (Fig. 8) is placed between the dies 25 where it is die drawn to the desired shape, the drawing operation extending across the welded joint indicated by the dark portion in the center of the sheet 22.

Each and all of these modifications of product and process of my invention as well as those numerous others which will doubtless be evolved, the generic spirit of the invention should bring within the scope of the annexed claims.

What I claim as new and useful and desire to protect by Letters Patent is:—

1. The method of making flat stock metal sheets adapted to be used in forming stampings by die drawing which consists in flash welding together a multiple number of sheets smaller than the sheet required, removing the flash from the seam of the weld almost but not quite to the gauge of the sheets, and thereafter by a subsequent operation reducing the seam precisely to the gauge of the sheets.

2. The method of making flat stock metal sheets capable of being used in forming stampings by die drawing which consists in flash welding together a multiple number of sheets smaller than the sheet required, cutting the flash from the seam of the weld almost but not quite to the gauge of the sheets, and then hammering down the seam precisely to the gauge of the sheets.

3. In the manufacture of flat stock sheets of metal suitable for use in forming stampings by die drawing, the method of producing a sheet of such relatively great width and thinness as to be difficult to roll to sufficiently uniform gauge by any known rolling mill process, which method comprises separately producing by the usual rolling mill process two relatively narrow sheets each having the desired thin and uniform gauge, uniformly annealing such narrow sheets, electrically flash welding the two narrow sheets together edge to edge in a common plane, removing the flash from the seam of the weld almost but not quite to the gauge of the sheets, and thereafter by a subsequent operation reducing the seam precisely to the gauge of the sheets, whereby the seam becomes an integral part of the resulting composite sheet, and the drawing quality of such sheet is substantially the same throughout.

4. The method of removing flash from thin metal sheets fabricated by flash welding which consists in first removing the main body of the flash in planes removed from the surfaces of the article a distance sufficient to prevent unwonted scarring of the surfaces of the sheet due to surface variations within permissible tolerances, and thereafter forging that part of the flash remaining on account of said tolerances down to the gauge of the material constituting the body of the sheet.

5. The method of removing flash from thin metal sheets fabricated by flash welding which consists in first removing the main body of the flash in planes as closely adjacent the surfaces of the sheet as tolerances for surface irregularity will permit without occasioning marring of the surfaces by the flash removing tool, and thereafter forging what remains of the flash within the established tolerances in successive stages down to the gauge of the material of the body of the sheet.

EDWARD G. BUDD.